(12) United States Patent
Hofmann et al.

(10) Patent No.: US 10,537,053 B2
(45) Date of Patent: Jan. 21, 2020

(54) IMPLEMENT WING CASTER WHEEL FOR TRANSPORT

(71) Applicant: Schulte Industries Ltd., Englefeld, Saskatchewan (CA)

(72) Inventors: Todd Hofmann, Saskatoon (CA); Vincent Colistro, Saskatoon (CA)

(73) Assignee: SCHULTE INDUSTRIES LTD., Englefeld (CA)

( * ) Notice: Subject to any disclaimer, the term of this patent is extended or adjusted under 35 U.S.C. 154(b) by 0 days.

(21) Appl. No.: 15/581,424

(22) Filed: Apr. 28, 2017

(65) Prior Publication Data

US 2017/0354084 A1 Dec. 14, 2017
US 2018/0352717 A9 Dec. 13, 2018

(30) Foreign Application Priority Data

Jun. 1, 2016 (CA) ...................................... 2931729

(51) Int. Cl.
| | |
|---|---|
| *A01B 73/06* | (2006.01) |
| *A01B 63/22* | (2006.01) |
| *A01B 73/04* | (2006.01) |
| *A01B 76/00* | (2006.01) |

(52) U.S. Cl.
CPC ............ *A01B 73/067* (2013.01); *A01B 63/22* (2013.01); *A01B 73/048* (2013.01); *A01B 76/00* (2013.01)

(58) Field of Classification Search
CPC ............................ A01B 73/067; A01B 73/048
USPC ....................................................... 172/311
See application file for complete search history.

(56) References Cited

U.S. PATENT DOCUMENTS

| | | | |
|---|---|---|---|
| 2,828,597 A | 4/1958 | Moore | |
| 2,973,818 A * | 3/1961 | Marvin | A01C 23/04 172/456 |
| 3,539,016 A | 11/1970 | Bauer et al. | |
| 3,548,954 A * | 12/1970 | Lindemann | A01B 73/02 172/311 |
| 3,640,345 A | 2/1972 | Sosalla | |
| 3,870,107 A * | 3/1975 | Orthman | A01B 63/22 172/260.5 |
| 3,990,521 A * | 11/1976 | Ankenman | A01B 73/02 172/311 |
| 4,119,156 A * | 10/1978 | Wheeler | A01B 3/46 172/386 |

(Continued)

*Primary Examiner* — Robert E Pezzuto
*Assistant Examiner* — Joel F. Mitchell
(74) *Attorney, Agent, or Firm* — King & Schickli, PLLC

(57) ABSTRACT

An agricultural implement has a hitch frame, a center frame pivotally attached rearward of the hitch frame about a hitch pivot axis. Wing frames are pivotally attached to ends of the center frame and a center actuator is pivots the center and wing frames from a rearward extending operating position to an upward extending transport position. Caster wheels are pivotally mounted on front sides of the wing frames about caster and transport axes. In the operating position, the caster axes are oriented vertically and the transport axes are oriented horizontally, and in the initial transport position, the caster axes are oriented horizontally, perpendicular to the hitch pivot, the transport axes are oriented vertically, and caster wheel actuators pivot the caster wheels 90 degrees about the transport axes to align the caster axes with the hitch pivot axis. The caster wheels support the wing frames in both operating and transport positions.

8 Claims, 16 Drawing Sheets

(56) References Cited

U.S. PATENT DOCUMENTS

| | | | | |
|---|---|---|---|---|
| 4,286,672 A | * | 9/1981 | Forsyth | A01B 73/02 172/311 |
| 4,418,762 A | | 12/1983 | Page | |
| 4,821,809 A | | 4/1989 | Summach et al. | |
| 5,191,942 A | * | 3/1993 | Bussiere | A01B 21/04 172/248 |
| 5,839,516 A | * | 11/1998 | Arnold | A01B 73/02 172/456 |
| 6,860,335 B2 | * | 3/2005 | Arnett | A01B 73/065 111/57 |
| 7,861,795 B2 | * | 1/2011 | Dillon | A01B 73/02 172/311 |
| 8,127,861 B2 | * | 3/2012 | Meek | A01B 73/065 172/311 |
| 8,727,032 B2 | * | 5/2014 | Friggstad | A01B 73/065 172/311 |

* cited by examiner

IMPLEMENT WING CASTER WHEEL FOR TRANSPORT

This disclosure relates to the field of agricultural implements and in particular a wing caster wheel arrangement for implements with rear folding wing sections where the caster wheel functions to support the wing section in operating and transport positions.

BACKGROUND

A common type of wide agricultural implement includes right and left wing frame sections pivotally attached to a center frame section where the wing frame sections fold rearward for transport. Ground engaging tools such as discs, harrows and packers are mounted on the center and wing frame sections.

A hitch frame is mounted on center wheels at a rear end thereof and extends forward from the center wheels to a hitch tongue adapted to be attached to the drawbar of a towing vehicle. A center frame section is pivotally mounted on the rear end of the hitch frame about a hitch pivot axis that is perpendicular to the operating travel direction. Right and left elongate wing tool bars are in turn pivotally attached to outer ends of the center frame section about right and left wing pivot axes that are aligned with the operating travel direction when in the operating position so that the wing frame sections can pivot up and down with respect to the center frame section to follow ground contours. Wing operating wheels are attached to outer portions of each wing to support the wings in the operating position.

For transport the rear end of the center frame section is pivoted upward about the hitch pivot axis and the rear ends of the wing frame sections also pivot upward moving the ground engaging tools above the ground, and typically as the wing frame sections pivot upward, wing transport wheels move down into contact with the ground and the wing operating wheels are raised above the ground. The wing operating wheels are oriented to roll in the operating travel direction when the wings are in the operating position, and the wing transport wheels are oriented to roll perpendicular to the operating travel direction. Thus when the rear ends of the center and wing frame sections are raised to a position where the wing pivot axes is vertical, the operator can move the implement forward in the operating travel direction and as the center frame section moves in the operating travel direction, the wings frame sections move to a position trailing behind the center frame section and substantially aligned with the operating travel direction.

Such implements are disclosed for example in U.S. Pat. No. 4,821,809 to Summach, et al., U.S. Pat. No. 4,418,762 to Page, U.S. Pat. No. 3,640,345 to Sosalla, and U.S. Pat. No. 3,539,016 to Bauer et al. U.S. Pat. No. 2,828,597 to Moore shows a similar implement with a somewhat different arrangement where the frame is not pivoted, but the ground engaging tools, such as harrows which are relatively light, are simply moved manually to hang on racks. Here the same wheel is used for field and for transport and simply casters about its vertical axis.

U.S. Pat. No. 3,491,836 to Doepker discloses a similar winged implement where the center and wing frame section are moved to an upright position. The wing wheels are caster wheels pivotally mounted to the implement frame such that when the wings move to the upright position, the caster wheel remains on the ground. In this implement the wing frame sections are pushed forward riding on the castering wing wheels and secured to the hitch such that the wing frame sections ride on the castering wing wheels during transport.

SUMMARY OF THE INVENTION

The present disclosure provides an agricultural implement apparatus with right and left wing frame sections that overcomes problems in the prior art.

The present disclosure provides an agricultural implement apparatus comprising a hitch frame with a forward end thereof adapted for attachment to a towing vehicle. A center frame section has a front end thereof pivotally attached to a rear end of the hitch frame about a hitch pivot axis oriented substantially horizontally and perpendicular to an operating travel direction, and center wheels support the rear end of the hitch frame for travel in the operating travel direction. Right and left wing frame sections are pivotally attached at inner ends thereof to corresponding right and left ends of the center frame section about corresponding right and left wing pivot axes, and a center actuator is operative to pivot the center frame section about the hitch pivot axis such that the center frame section and right and left wing frame sections move from an operating position extending rearward from the hitch pivot axis to an initial transport position extending upward from the hitch pivot axis. The right and left wing pivot axes are oriented substantially horizontally and parallel to the operating travel direction when the frame sections are in the operating position, and the right and left wing pivot axes are oriented substantially vertically when the frame sections are in the initial transport position. Right and left caster wheel assemblies are mounted on front sides of outer end portions of the corresponding right and left wing frame sections, each caster wheel assembly comprising a caster wheel configured to support the corresponding right and left wing frame sections for movement along the ground, and each caster wheel assembly is pivotally mounted to the front side of the corresponding wing frame section about a caster axis and about a transport axis. The right and left caster wheel assemblies are free to pivot about the corresponding caster axes, and a pivotal position of the right and left caster wheel assemblies with respect to the corresponding transport axis is controlled by corresponding right and left primary caster wheel actuators. When the wing frame sections are in the operating position, the caster axes are oriented substantially vertically and the transport axes are oriented substantially horizontally and perpendicular to the hitch pivot axis, and when the wing frame sections are in the initial transport position, the caster axes are oriented substantially horizontally and perpendicular to the hitch pivot axis with the caster wheels on the ground supporting the wing frame sections, and the transport axes are oriented substantially vertically. When the wing frame sections are in the initial transport position, the right and left primary caster wheel actuators are operative to pivot the corresponding caster wheel assemblies about the corresponding transport axes through about 90 degrees such that the caster axes move to a transport orientation substantially aligned with the hitch pivot axis and towing the hitch assembly in the operating travel direction moves the wing frame sections to a final transport position trailing behind the center frame section with the caster axes substantially aligned with the operating travel direction.

The present disclosure provides an agricultural implement apparatus with caster wheel assemblies that support each wing frame section in both operating and transport positions. Heavy implements can be supported on dual wheels, and secondary caster wheel actuators can facilitate movement from the transport position to the operating position.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
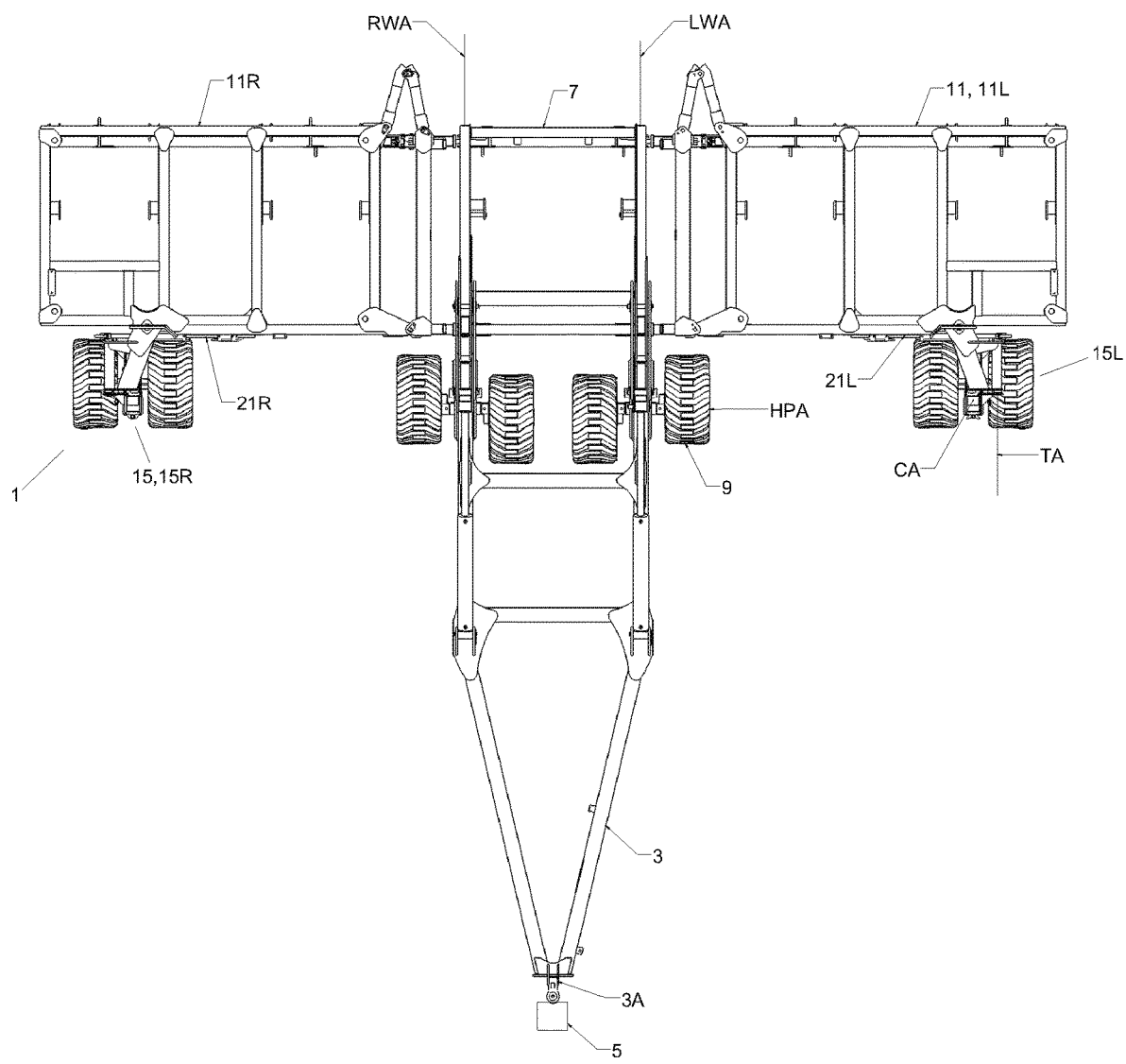
FIG. 1 is a schematic top view of an embodiment of an agricultural implement apparatus of the present disclosure shown in the operating position.

FIG. 1 illustrates an embodiment of an agricultural implement apparatus 1 of the present disclosure. The apparatus 1 comprises a hitch frame 3 with a forward end 3A thereof adapted for attachment to a towing vehicle 5. A center frame section 7 has a front end thereof pivotally attached to a rear end of the hitch frame 3 about a hitch pivot axis HPA oriented substantially horizontally and perpendicular to an operating travel direction T of the towing vehicle 5. Center wheels 9 support the rear end of the hitch frame 3 for travel in the operating travel direction T.

Figure 2:
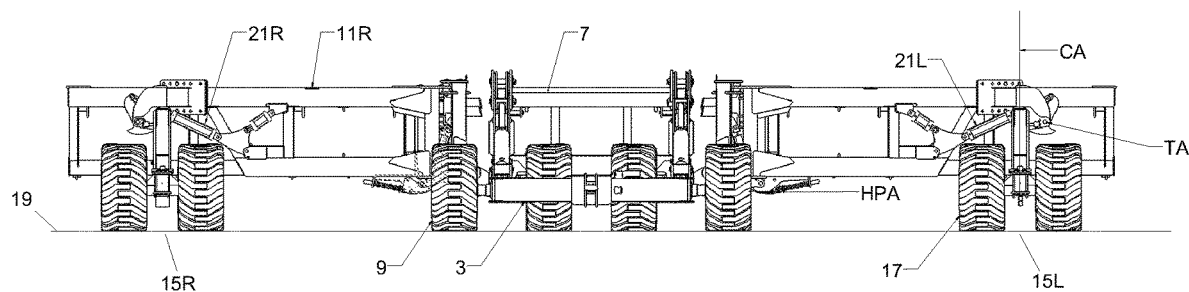
FIG. 2 is a schematic front view of the embodiment of FIG. 1 shown in the operating position.
Figure 3:
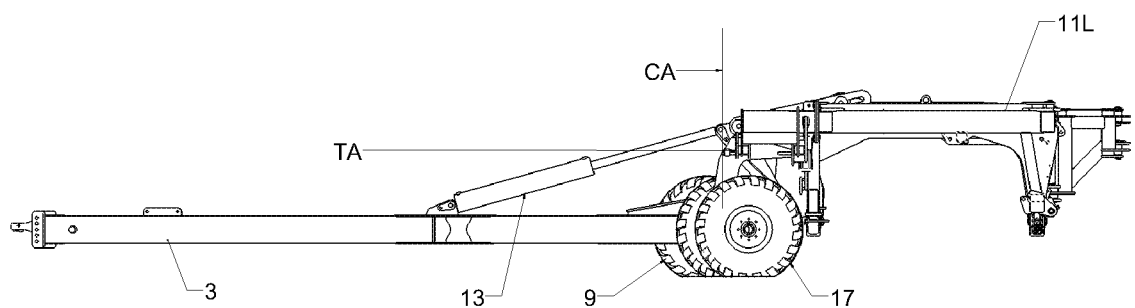
FIG. 3 is a schematic side view of the left end of the embodiment of FIG. 1 shown in the operating position.
Figure 4:
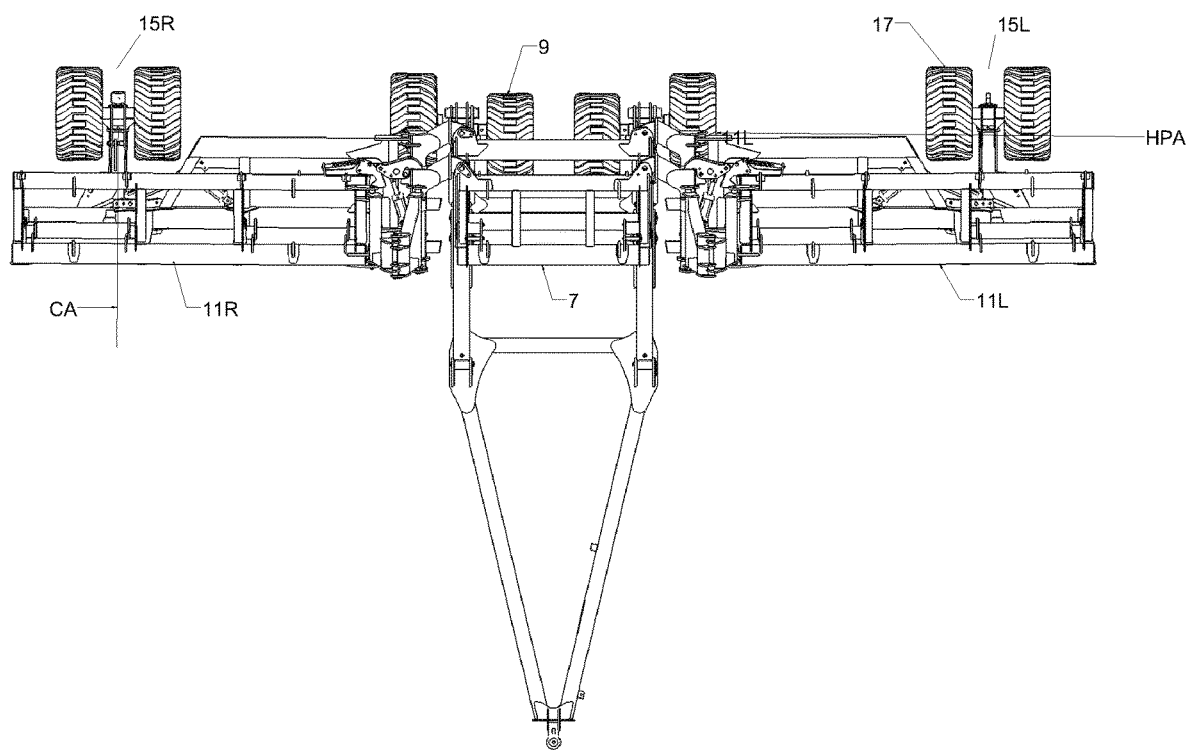
FIG. 4 is a schematic top view of the embodiment of FIG. 1 shown in the initial transport position.
Figure 5:
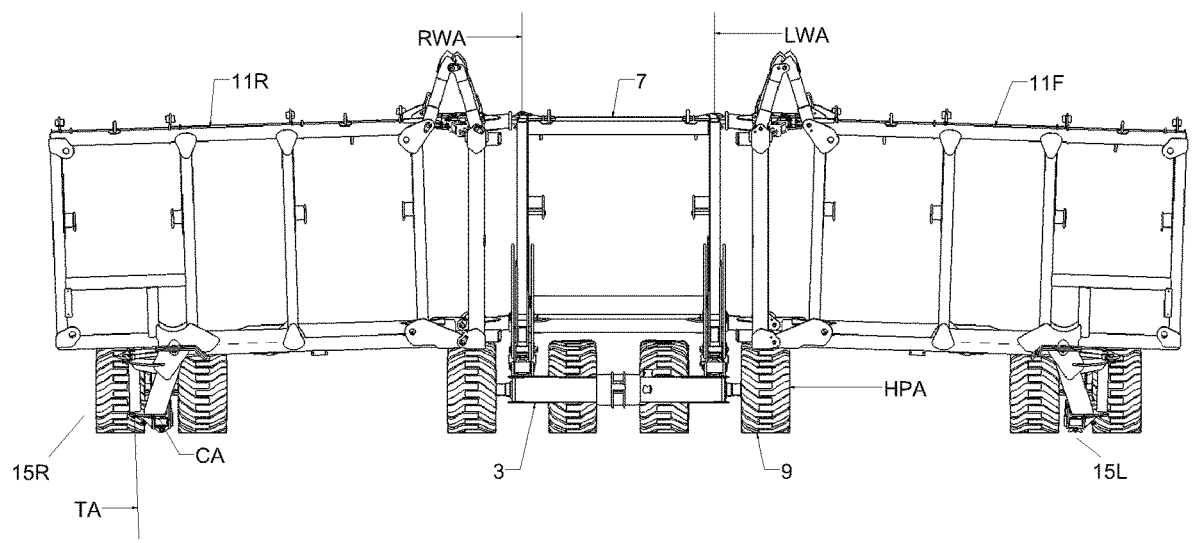
FIG. 5 is a schematic front view of the embodiment of FIG. 1 shown in the initial transport position.
Figure 6:
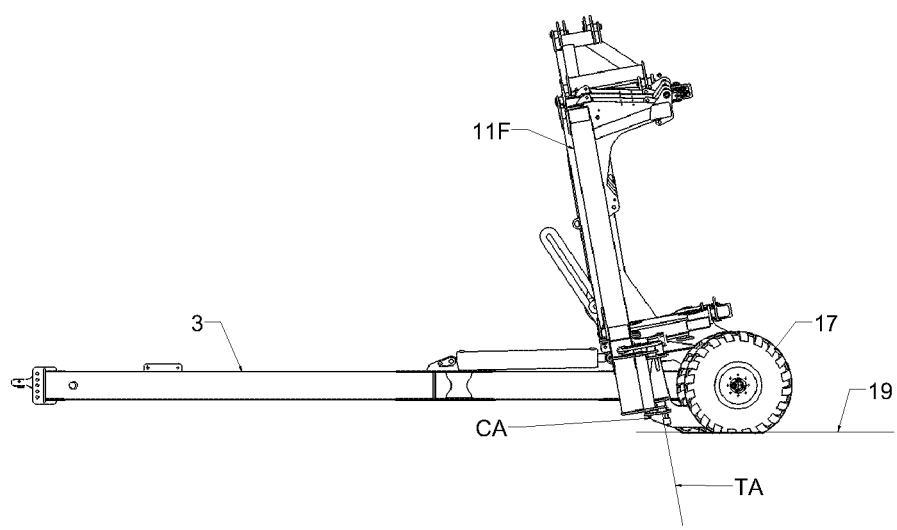
FIG. 6 is a schematic side view of the left end of the embodiment of FIG. 1 shown in the initial transport position.

Right and left wing frame sections 11R, 11L are pivotally attached at inner ends thereof to corresponding right and left ends of the center frame section about corresponding right and left wing pivot axes RWA, LWA. A center actuator 13 is operative to pivot the center frame section 7 about the hitch pivot axis HPA such that the center frame section 7 and right and left wing frame sections 11R, 11L move from an operating position extending rearward from the hitch pivot axis HPA as shown in FIGS. 1-3 to an initial transport position extending upward from the hitch pivot axis HPA as shown in FIGS. 4-6. Ground engaging tools such as discs, harrows, packers, and the like are mounted to the frame sections 7, 11.

In the illustrated apparatus 1 the center actuator 13 pivots the frame sections 7, 11 through 100 degrees such that, as illustrated in FIG. 6, the frame sections 7, 11 tilt slightly forward when in the initial transport position illustrated. This slight forward tilt is advantageous in the illustrated apparatus 1 as it reduces contact between the center frame section 7 and the wing frame sections 11, and between the ground engaging tools mounted thereon, during transport. Depending on the particular implement, the degree of movement may vary slightly but in any implement the frame sections 7, 11 will extend generally upward from the hitch pivot axis HPA when in the initial transport position.

The right and left wing pivot axes LWA, RWA are oriented substantially horizontally and parallel to the operating travel direction T when the frame sections 7, 11 are in the operating position of FIGS. 1-3, and the right and left wing pivot axes LWA, RWA are oriented generally upright when the frame sections 7, 11 are in the initial transport position of FIGS. 4-6.

Right and left caster wheel assemblies 15R, 15L are mounted on front sides of outer end portions of the corresponding right and left wing frame sections 11R, 11L. Each caster wheel assembly 15 comprises a caster wheel 17 configured to support the corresponding right and left wing frame sections 11 for movement along the ground 19. Each caster wheel assembly 15 is pivotally mounted to the front side of the corresponding wing frame section 11 about a caster axis CA and about a transport axis TA.

Each caster wheel assembly 15 is free to pivot about the caster axis CA, and a pivotal position of the right and left caster wheel assemblies 15R, 15L with respect to the corresponding transport axis TA is controlled by corresponding right and left primary caster wheel actuators 21R, 21L. When the wing frame sections 11 are in the operating position of FIGS. 1-3 the caster axes CA are oriented substantially vertically and the transport axes TA are oriented substantially horizontally and perpendicular to the hitch pivot axis.

When the wing frame sections 11 are moved to the initial transport position of FIGS. 4-6, the caster axes CA are oriented generally horizontally, but in the illustrated apparatus 1 slightly downward because of the slight forward tilt of the frame sections 11, and perpendicular to the hitch pivot axis HPA with the caster wheels 17 on the ground 19 supporting the wing frame sections 11, and the transport axes TA are oriented substantially vertically.

Figure 7:
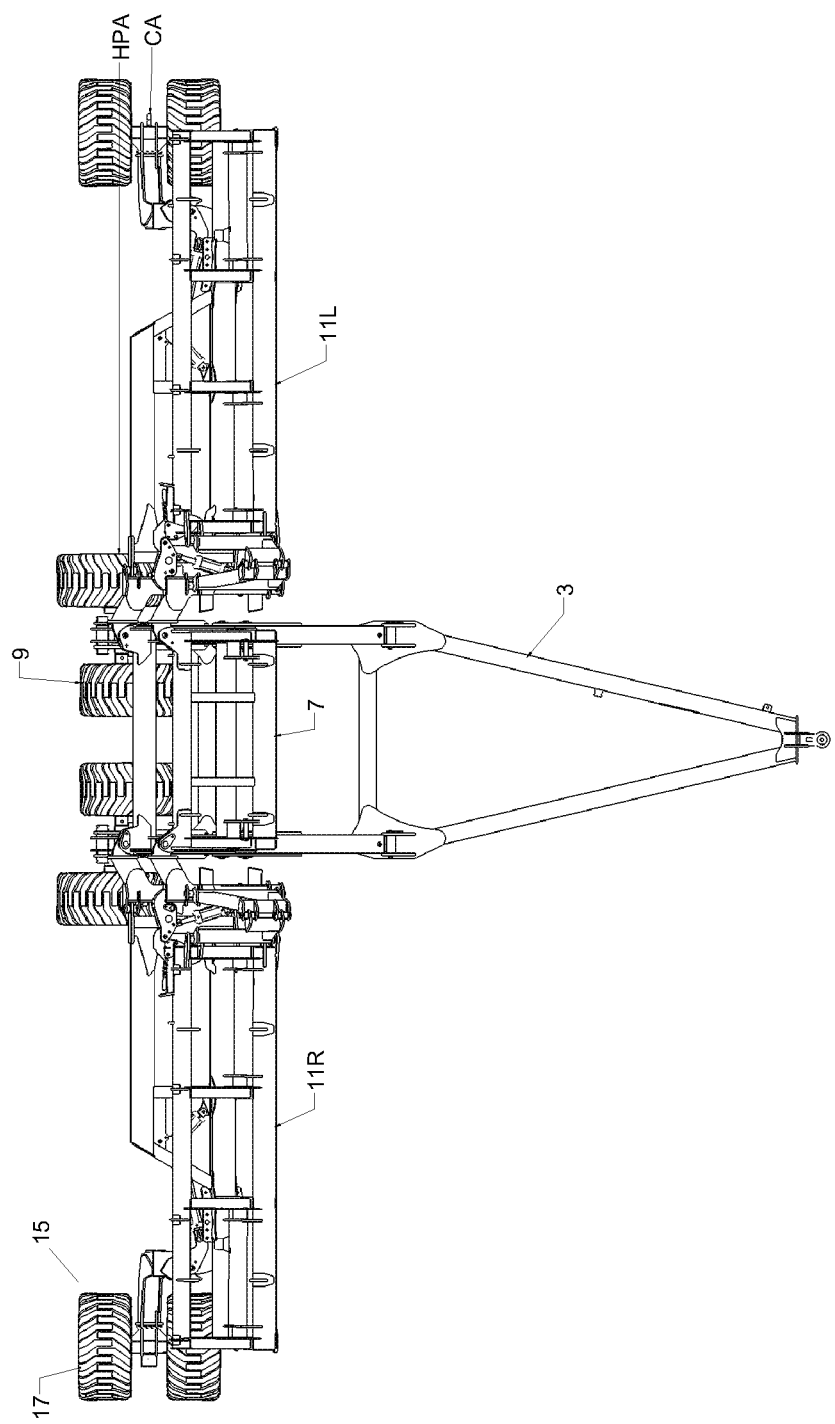
FIG. 7 is a schematic top view of the embodiment of FIG. 1 shown in the initial transport position with the wheel assemblies pivoted about the transport axes through 90 degrees.
Figure 8:
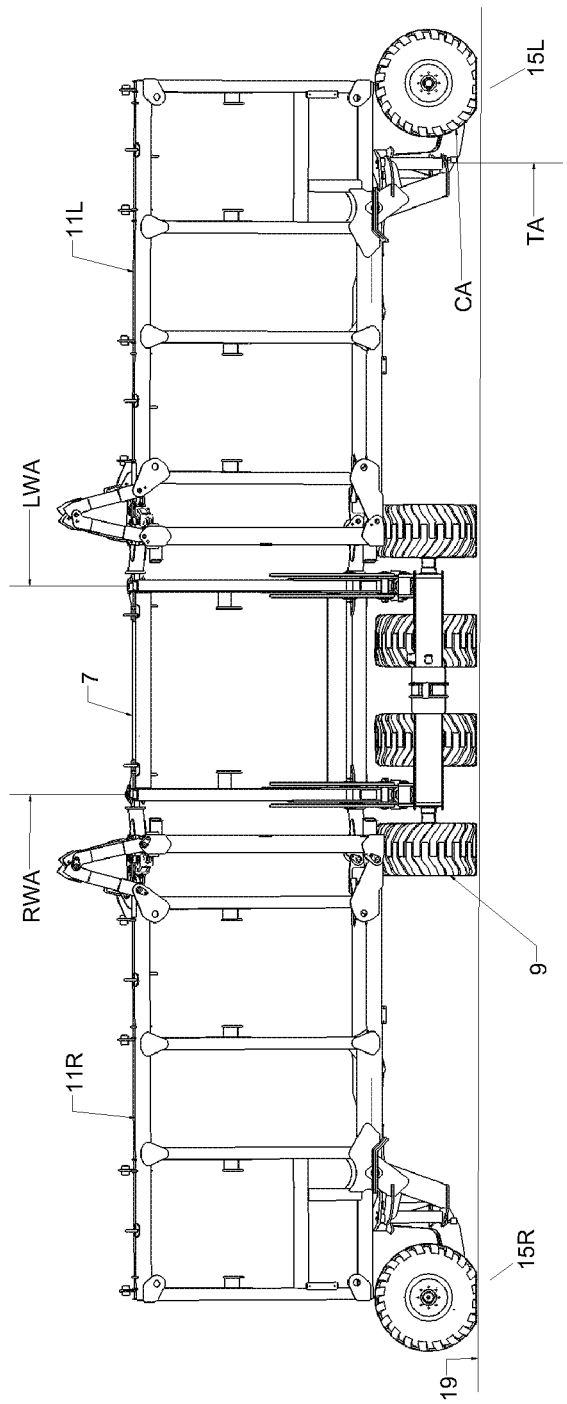
FIG. 8 is a schematic front view of the embodiment of FIG. 1 shown in the initial transport position with the wheel assemblies pivoted about the transport axes through 90 degrees.
Figure 9:
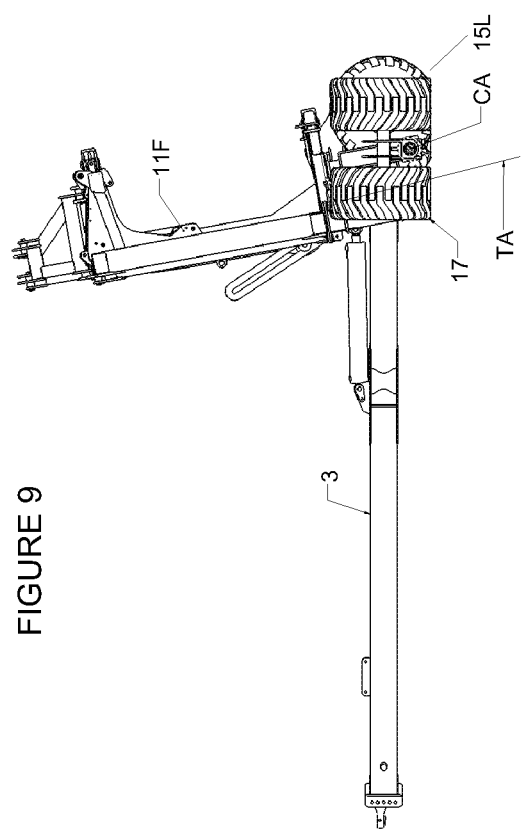
FIG. 9 is a schematic side view of the left end of the embodiment of FIG. 1 shown in the initial transport position with the wheel assemblies pivoted about the transport axes through 90 degrees.

When wing frame sections 11 are in the initial transport position, the right and left primary caster wheel actuators 21R, 21L are operative to pivot the corresponding caster wheel assemblies 15R, 15L about the vertical transport axes TA through about 90 degrees such that the caster axes CA move to a transport orientation substantially aligned with the hitch pivot axis HPA as shown in FIGS. 7-9. With the caster axes CA aligned with the hitch pivot axis HPA the rotational axis RA of the caster wheels 17 is perpendicular to the hitch pivot axis HPA, and towing the hitch assembly 3 in the operating travel direction T moves the wing frame sections 11 to a final transport position shown in FIG. 10 trailing behind the center frame section 7 with the caster axes CA substantially aligned with the operating travel direction T.

Figure 11:
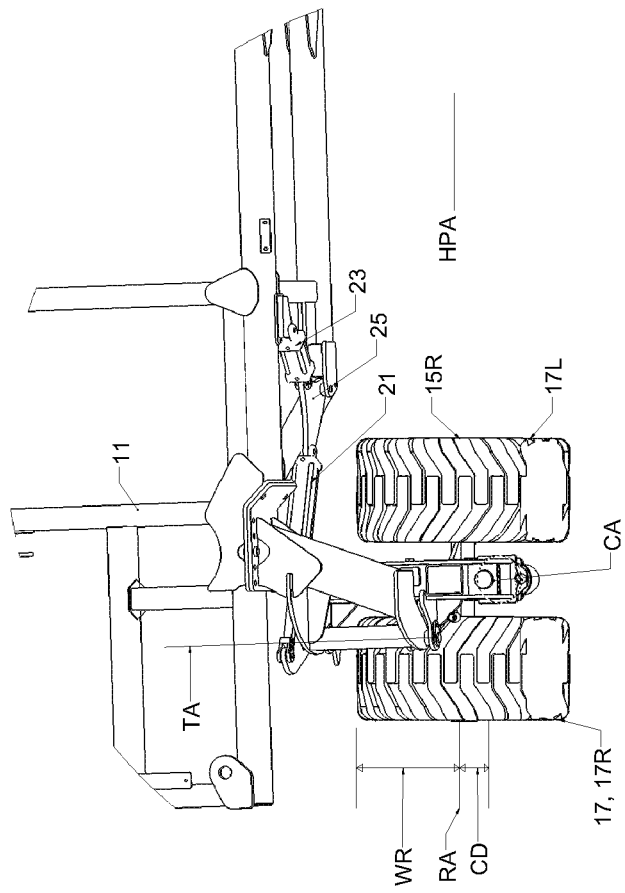
FIG. 11 is a schematic top view of the caster wheel assembly of the embodiment of FIG. 1 with the implement apparatus in the operating position, and also is a front view of the dual caster wheel assembly with the agricultural implement apparatus in the initial transport position.
Figure 12:
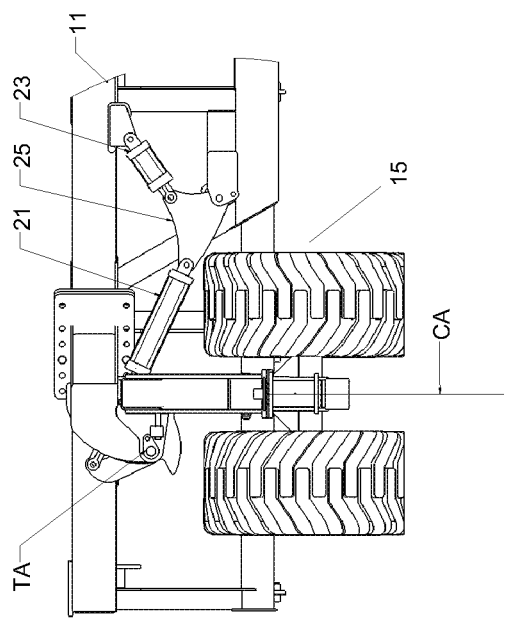
FIG. 12 is a schematic front view of the dual caster wheel assembly of FIG. 11 with the implement apparatus in the operating position, and also is a bottom view of the dual caster wheel assembly with the agricultural implement apparatus in the initial transport position.

FIGS. 11-14 schematically illustrate in more detail the caster wheel assembly 15. FIG. 11 is a top view of the caster wheel assembly 15 with the wing frame sections 11 in the operating position, and the person skilled in the art will recognize that FIG. 11 is also a front view of the caster wheel assembly 15 with the wing frame sections 11 in the initial transport position. Similarly FIG. 12 is a front view of the caster wheel assembly 15 with the wing frame sections 11 in the operating position, and the person skilled in the art will recognize that FIG. 12 is also a bottom view of the caster wheel assembly 15 with the wing frame sections 11 in the initial transport position.

Each caster wheel assembly 15 comprises right and left caster wheels 17R, 17L located, when the wing frame sections 11 are in the operating position, on corresponding right and left sides of the caster castor axis CA and rotatable about a common rotational axis RA located a caster distance CD rearward of the corresponding castor axis CA. The right and left caster wheels 17 have a radius WR greater than the castor distance CD such that when the caster axis CA is oriented horizontally, the castor wheels 17 extend below the caster axis CA to support the corresponding wing frame section 11 for movement along the ground.

Figure 10:
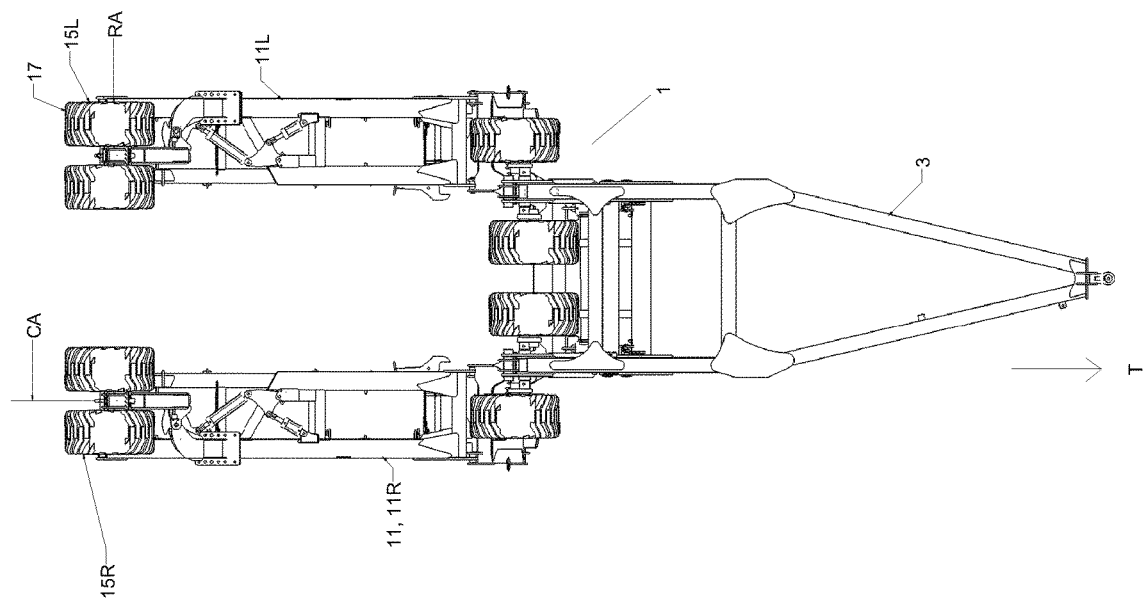
FIG. 10 is a schematic top view of the embodiment of FIG. 1 in the final transport position.

In the illustrated arrangement the transport axis TA is laterally offset from the corresponding caster axis CA such that the caster wheel assemblies 15 pivot from the rearward extending position of FIG. 4 to the position shown in FIG. 7 under the wing frame sections 11 to provide a narrow transport width as illustrated in FIG. 10.

It is contemplated that for lighter implements a single wheel 17 might be used instead of the illustrated dual wheels 17R, 17L.

Figure 13:
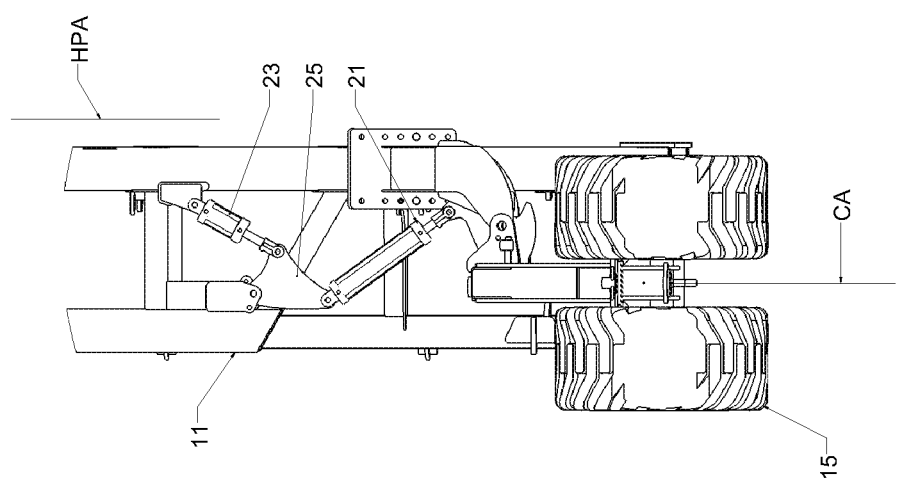
FIG. 13 is a schematic bottom view of the dual caster wheel assembly of FIG. 11 with the caster wheel assembly pivoted 90 degrees about the transport axis from the caster wheel assembly position of FIG. 12.

The primary caster wheel actuators 21 pivot the caster wheel assembly 15 through 90 degrees from the position of FIG. 12 to the position of FIG. 13 where the caster axis CA is in the transport orientation aligned with the hitch pivot axis HPA. With the wheels 17 in this position towing the hitch assembly in the operating travel direction will move the wing frame sections 11 to the final transport position shown in FIG. 10 trailing behind the center frame section. When moving from the final transport position back to the initial transport position of FIG. 4, some maneuvering of the towing vehicle in reverse and manipulation of the primary caster wheel actuators 21 is required to have the wing frame sections move outward to the laterally aligned initial transport position, where the apparatus 1 can then be moved to the operating position.

A further advantage is provided in that with the caster axes CA oriented generally horizontally and aligned with the operating travel direction T when in the final transport position, the side by side dual wheels 17 can move up and down with respect to each other, pivoting the caster wheel assemblies 15 about the caster axes CA, to follow ground contours and maintain contact of each wheel 17 with the ground.

Figure 14:
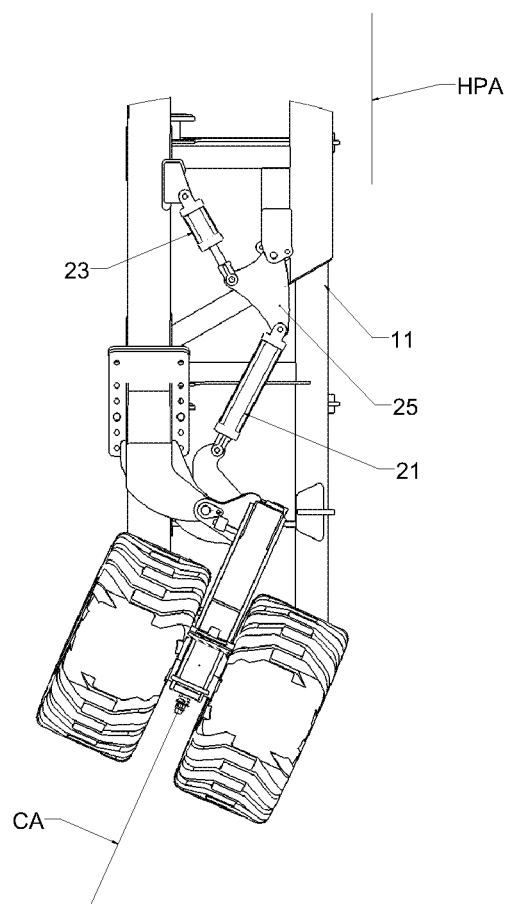
FIG. 14 is a schematic bottom view of the dual caster wheel assembly of FIG. 11 with the caster wheel assembly pivoted a further 15 degrees about the transport axis from the caster wheel assembly position of FIG. 13.
Figure 15:
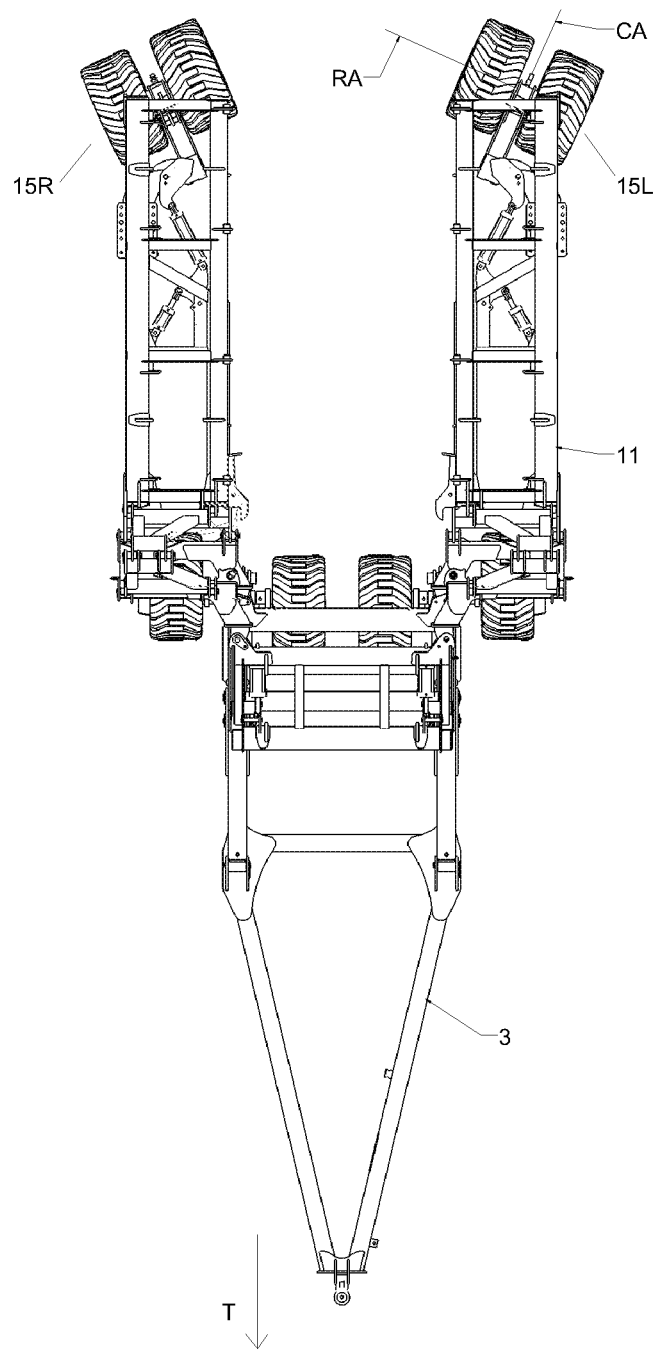
FIG. 15 is schematic a schematic top view of the embodiment of FIG. 1 in a transport position with the wheels oriented as illustrated in FIG. 14.

To facilitate movement of the wing frame sections 11 from the final to the initial transport position right and left secondary caster wheel actuators 23R, 23L can be provided that are operative, when the wing frame sections 11 are in the initial transport position, to pivot the corresponding caster wheel assemblies 15 about the transport axis TA such that the caster axes CA move beyond the transport orientation to the position of FIGS. 14 and 15. It can be seen in FIG. 15 that with the caster axes CA in the illustrated position, the rotational axis RA of the wheels will be oriented such that when the hitch frame 3 is moved rearward with respect to the operating travel direction T, the wheels 17 will steer the rear ends of the wing frame sections 11 outward and start moving the wing frame sections 11 toward the initial transport position.

With the wing frame sections 11 started in the desired direction, maneuvering of the towing vehicle and actuators required to attain the initial transport position is reduced. Typically an additional 10 to 20 degrees of pivoting beyond the transport orientation will provide adequate steering.

In FIGS. 11-14 the primary caster wheel actuators 21 are provided by primary hydraulic cylinders and the secondary caster wheel actuators 23 are provided by secondary hydraulic cylinders. The primary and secondary hydraulic cylinders 21, 23 are connected to a pivot plate 25 which is pivotally attached to the wing frame section 11 about a plate pivot axis PA.

The primary hydraulic cylinder 21 moves from the fully extended position of FIGS. 11 and 12 to the fully retracted position shown in FIGS. 13 and 14 to pivot the caster wheel assembly 15 about the transport axis TA through about 90 degrees. This arrangement allows the operator to simply fully extend and fully contract the primary hydraulic cylinders, such that there is no guessing where the primary hydraulic cylinders are in their stroke to achieve the desired position. The pivot plate 25 is held stationary by stationary the secondary hydraulic cylinder 23 as the primary hydraulic cylinder 23 retracts from the position of FIG. 12 to the position of FIG. 13.

Similarly, the secondary hydraulic cylinder 23 moves from the fully retracted position of FIG. 13 to the fully extended position of FIG. 14 to pivot the caster wheel assembly 15 about the transport axis TA through the desired angle beyond the transport orientation. The pivot plate 25 pivots about the plate pivot axis PA as the secondary hydraulic cylinder 23 extends, thereby moving the primary hydraulic cylinder 21 to pivot the caster axis CA through the desired added angle.

Figure 16:
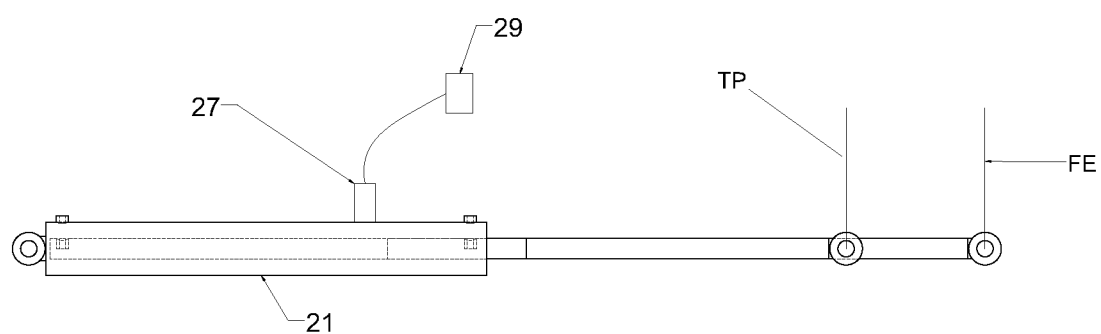
FIG. 16 is a schematic side view of an alternate primary actuator with a longer stroke and a position sensor for use with the embodiment of FIG. 1.

It is contemplated as well that the right and left primary caster wheel actuators could also be operative to pivot the corresponding caster wheel assemblies about the transport axis through about 10 to 20 degrees beyond the transport orientation without using secondary caster wheel actuators. As schematically illustrated in FIG. 16, each of the right and left primary caster wheel actuators, illustrated as primary hydraulic cylinders 21' includes a position sensor 27 operative to indicate to an operator display 29 when the primary hydraulic cylinder 21' is extended to a transport position TP where the corresponding caster wheel assemblies are pivoted about the transport axis to the transport orientation and the operator 29 can then stop the primary hydraulic cylinders 21' at that position. To facilitate movement of the wing frame sections from the final to the initial transport position the operator can then further extend the right and left primary hydraulic cylinders 21' to a fully extended position FE to pivot the corresponding caster wheel assemblies through about 10 to 20 degrees beyond the transport orientation.

The present disclosure provides an agricultural implement apparatus 1 with caster wheel assemblies 15 supporting each wing frame section 11 in both the operating position and the final transport position. Heavy implements can be supported on dual wheels 17.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An agricultural implement apparatus comprising:
   a hitch frame with a forward end thereof adapted for attachment to a towing vehicle;
   a center frame section with a front end thereof pivotally attached to a rear end of the hitch frame about a hitch pivot axis oriented substantially horizontally and perpendicular to an operating travel direction;
   center wheels supporting the rear end of the hitch frame for travel in the operating travel direction;
   right and left wing frame sections pivotally attached at inner ends thereof to corresponding right and left ends of the center frame section about corresponding right and left wing pivot axes;
   a center actuator configured to pivot the center frame section about the hitch pivot axis such that the center frame section and right and left wing frame sections move from an operating position extending rearward from the hitch pivot axis to an initial transport position extending upward from the hitch pivot axis;
   wherein the right and left wing pivot axes are oriented substantially horizontally and parallel to the operating travel direction when the frame sections are in the operating position, and the right and left wing pivot axes are oriented generally upright when the frame sections are in the initial transport position;
   right and left caster wheel assemblies mounted on front sides of outer end portions of the corresponding right and left wing frame sections, each caster wheel assembly configured to support the corresponding right and left wing frame sections for movement along the ground, and wherein each caster wheel assembly is pivotally mounted to the front side of the corresponding wing frame section about a caster axis and about a transport axis;
   wherein each caster wheel assembly includes right and left caster wheels located, when the wing frame sections are in the operating position, on corresponding right and left sides of the caster axis and rotatable about a common rotational axis located a caster distance rearward of the corresponding caster axis;
   wherein the right and left caster wheel assemblies pivot freely during operation about the corresponding caster axes, and a pivotal position of the right and left caster wheel assemblies with respect to the corresponding transport axis is controlled by corresponding right and left primary caster wheel actuators;
   wherein when the wing frame sections are in the operating position, the caster axes are oriented generally upright and the transport axes are oriented substantially horizontally and perpendicular to the hitch pivot axis;
   wherein when the wing frame sections are in the initial transport position, the caster axes are oriented generally horizontally and perpendicular to the hitch pivot axis with the caster wheels on the ground supporting the wing frame sections, and the transport axes are oriented generally upright;
   wherein the right and left primary caster wheel actuators are configured such that when the wing frame sections are in the initial transport position, activating the right and left primary caster wheel actuators pivots the corresponding caster wheel assemblies about the corresponding transport axes through about 90 degrees such that the caster axes move to a transport orientation substantially aligned with the hitch pivot axis; and
   wherein towing the hitch frame in the operating travel direction moves the wing frame sections to a final transport position trailing behind the center frame section with the caster axes substantially aligned with the operating travel direction.

2. The apparatus of claim 1 wherein on each caster wheel assembly, the right and left caster wheels have a radius greater than the caster distance such that when the caster axis is oriented horizontally, the caster wheels extend below the caster axis to support the corresponding wing frame section for movement along the ground.

3. The apparatus of claim 1 comprising right and left secondary caster wheel actuators operative, when the wing frame sections are in the initial transport position, to pivot the corresponding caster wheel assemblies about the transport axis beyond the transport orientation.

4. The apparatus of claim 3 wherein the primary caster wheel actuators comprise primary hydraulic cylinders and the secondary caster wheel actuators comprise secondary hydraulic cylinders, and wherein the primary hydraulic cylinders move from a fully extended position to a fully retracted position to pivot the corresponding caster wheel assemblies about the corresponding transport axes through about 90 degrees, and wherein the wherein the secondary hydraulic cylinders move from a fully extended position to a fully retracted position to pivot the corresponding caster wheel assemblies about the corresponding transport axes through a desired angle beyond the transport orientation.

5. The apparatus of claim 4 wherein the primary and secondary hydraulic cylinders are connected to a pivot plate, and wherein the pivot plate is pivotally attached to the corresponding wing frame section.

6. The apparatus of claim 3 wherein each secondary caster wheel actuator is operative to pivot the corresponding caster wheel assembly through about 10 to 20 degrees beyond the transport orientation.

7. The apparatus of claim 1 wherein the right and left primary caster wheel actuators each include a position sensor operative to indicate to an operator when the corresponding caster wheel assemblies are pivoted about the transport axis to the transport orientation, and wherein the right and left primary caster wheel actuators are further extendable to a fully extended position to pivot the corresponding caster wheel assemblies through about 10 to 20 degrees beyond the transport orientation.

8. The apparatus of claim 1 wherein each transport axis is laterally offset from the corresponding caster axis.

* * * * *